US006975441B2

(12) United States Patent
Iizuka

(10) Patent No.: US 6,975,441 B2
(45) Date of Patent: Dec. 13, 2005

(54) SCANNING OPTICAL SYSTEM

(75) Inventor: Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/019,222

(22) Filed: Dec. 23, 2004

(65) Prior Publication Data

US 2005/0152013 A1 Jul. 14, 2005

(30) Foreign Application Priority Data

Dec. 25, 2003 (JP) .............................. 2003-430590

(51) Int. Cl.$^7$ ............................................. G02B 26/08
(52) U.S. Cl. ..................................... 359/205; 359/212
(58) Field of Search ............................... 359/196–226; 347/243, 244, 258–261

(56) References Cited

U.S. PATENT DOCUMENTS 6,195,190 B1 * 2/2001 Tachibe et al. ............. 359/216
6,326,992 B1 * 12/2001 Inoue et al. ................ 347/241
6,489,982 B2 * 12/2002 Ishibe ........................ 347/134

FOREIGN PATENT DOCUMENTS

JP 59-15206 1/1984
JP 2736984 1/1998

* cited by examiner

Primary Examiner—James Phan
(74) Attorney, Agent, or Firm—Greenblum & Bernstein, P.L.C.

(57) ABSTRACT

A scanning optical system has a scanning optical apparatus, which is provided with a laser diode, a collimating lens that collimates a laser beam emitted by the laser diode, a support member that holds and supports the laser diode and the collimating lens, a deflection member that dynamically deflects the laser beam collimated by the collimating lens in a main scanning direction, and a plastic scanning lens that converges the deflected laser beam onto a target surface. The scanning optical apparatus is configured to satisfy following conditions:

Figure 1:
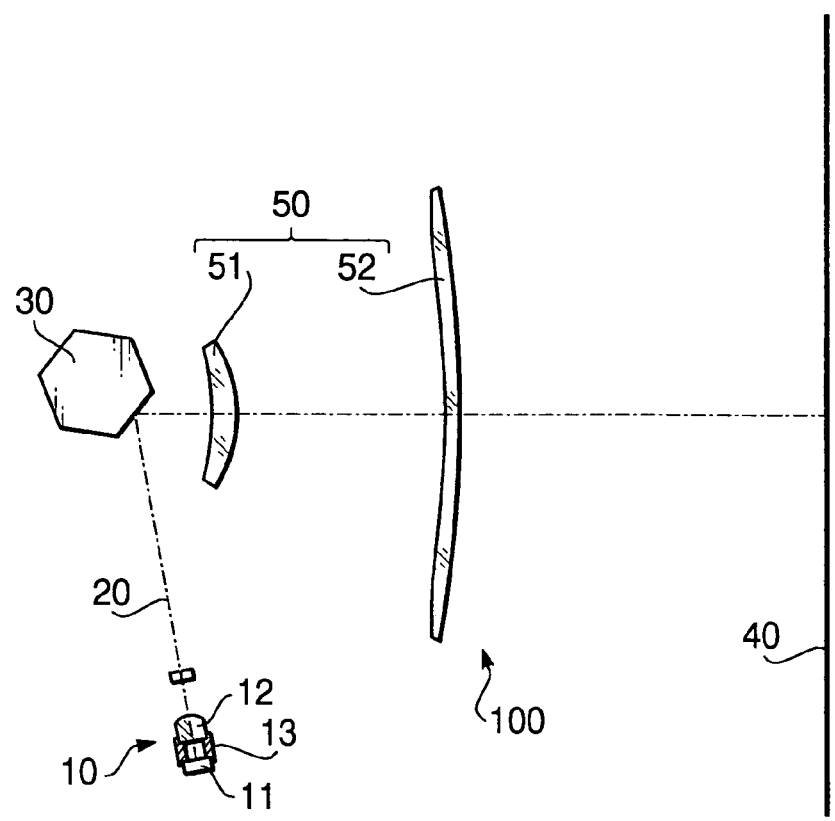

$$10 < \frac{f}{fc} < 20; \text{ and } fc \cdot nc > t > fc\left(\frac{nc}{nc+1}\right),$$

where, f denotes a focal length of the scanning lens in the main scanning direction, fc denotes a focal length of the collimating lens, nc denotes a refractive index of the collimating lens, and t denotes a thickness of the collimating lens along an optical axis.

5 Claims, 2 Drawing Sheets

SCANNING OPTICAL SYSTEM

BACKGROUND OF THE INVENTION

The present invention relates to a scanning optical apparatus which is used, for example, as a laser scanning unit of a laser beam printer, and more particularly to a technique for preventing occurrence of displacement of a focusing point due to temperature change.

The scanning optical apparatus generally employs a laser diode and a collimating lens that collimates a laser beam emitted by the laser diode. When ambient temperature of members securing the laser diode and the collimating lens changes, the securing members may expands and/or contracts and positional relationship therebetween and/or with respect to the entire optical system may change, and a focusing point (a point on which the beam is focused by the optical system) may deviated in a direction of the optical axis.

Japanese Patent Provisional Publication No. SHO 59–15206 discloses a structure which avoids such a problem. According to the teaching, the laser diode and the collimating lens are secured using a double-layer structure using two members with different thermal expansion coefficients, and displacement of the collimating lens due to thermal expansion of one member and displacement of the collimating lens due to thermal expansion of the other member are cancelled out by each other.

The scanning optical apparatus also employs a scanning lens (e.g., fθ lens). When a glass lens is used as the scanning lens, it is sufficient that a distance between a light emitting point and the collimating lens is controlled to be kept constant.

Recently, a plastic lens is often used as a scanning lens (e.g., fθ lens) in order to reduce a manufacturing cost. If the plastic lens is used as the scanning lens, thermal expansion of the scanning lens and a change in refractive index of the scanning lens due to the temperature change cannot be ignored. That is, when the plastic scanning lens is employed in the scanning optical system, the structure disclosed in the above publication may not compensate for the deviation of the focusing point sufficiently.

When the temperature increases, the focal length of the plastic scanning lens increases, and thus, the focusing point is shifted in a direction away from the scanning lens. On the other hand, when the temperature increases, the distance between the light emitting point and the collimating lens increases if they are secured on a single securing member. As the distance between the light emitting point and the collimating lens increases, the beam emitted by the laser diode cannot be collimated by the collimating lens, rather a converging beam is emerged from the collimating lens. In such a case, the focusing point is shifted in a direction toward the scanning lens. Furthermore, when the temperature increases, the wavelength of the laser beam emitted by the laser diode is shifted in a longer side.

Japanese Patent No. 2736984 discloses technology in which, in consideration of change in characteristics of the plastic scanning lens and wavelength variations of the laser beam due to the temperature change, deviation of the focusing point due to the temperature change is suppressed by utilizing thermal expansion of a securing member for securing both the laser diode and the collimating lens. By using aluminum or zinc as a material for the support member, the deviation of the focusing point due to temperature change is compensated for.

It should be noted that since the optical system of the scanning optical apparatus constitutes a magnifying optical system which is a combination of a collimating lens with a short focal length and a scanning lens with a long focal length, a change in distance between a light emitting point and the collimating lens due to temperature change is magnified on an image side, resulting in the deviation of the focusing point. Therefore, the position of the collimating lens to the securing member has to be managed at high accuracy. For this purpose, according to configuration described in the above patent publication, the double-layer structure is employed, in which the collimating lens is attached to a lens frame and the lens frame is attached to the securing member.

In the conventional scanning optical apparatuses described above, however, the double-layer structure having a relatively complex securing member is employed. Further, the securing member is formed of a metal such as aluminum or zinc. Therefore, the structure of an optical scanning unit also becomes complex and expensive.

SUMMARY OF THE INVENTION

The present invention is advantageous in that a scanning optical apparatus employs a simple and cost effective structure and allows displacement of focal point due to temperature change to be suppressed.

According to an aspect of the invention, there is provided a scanning optical system having a scanning optical apparatus, which is provided with a laser diode that emits a laser beam, a collimating lens that collimates the laser beam emitted by the laser diode, a support member that holds and supports the laser diode and the collimating lens, a deflection member that dynamically deflects the laser beam collimated by the collimating lens in a main scanning direction, and a plastic scanning lens that converges the deflected laser beam onto a target surface. Further, the scanning optical apparatus is configured to satisfy following conditions:

$$10 < \frac{f}{fc} < 20; \text{ and } fc \cdot nc > t > fc\left(\frac{nc}{nc+1}\right),$$

where, f denotes a focal length of the scanning lens in the main scanning direction, fc denotes a focal length of the collimating lens, nc denotes a refractive index of the collimating lens, and t denotes a thickness of the collimating lens along an optical axis.

Optionally, the support member may be made of plastic, and the scanning optical apparatus may be configured to satisfy the following condition:

$$150 \times 10^{-6} < \alpha \cdot \left(fc - \frac{t}{nc}\right) \cdot \frac{f}{fc^2} < 325 \times 10^{-6},$$

where α denotes a linear expansion coefficient of the collimating lens in a direction of the optical axis thereof. In a particular case, the linear expansion coefficient α satisfies a condition $\alpha > 4 \times 10^{-5}$. The linear expansion coefficient α may be greater than $7 \times 10^{-5}$.

Further optionally, the collimating lens may be a piano-convex lens having a planar surface on the laser diode side and a convex surface on the deflection member side.

BRIEF DESCRIPTION OF THE ACCOMPANYING DRAWINGS

Figure 2:
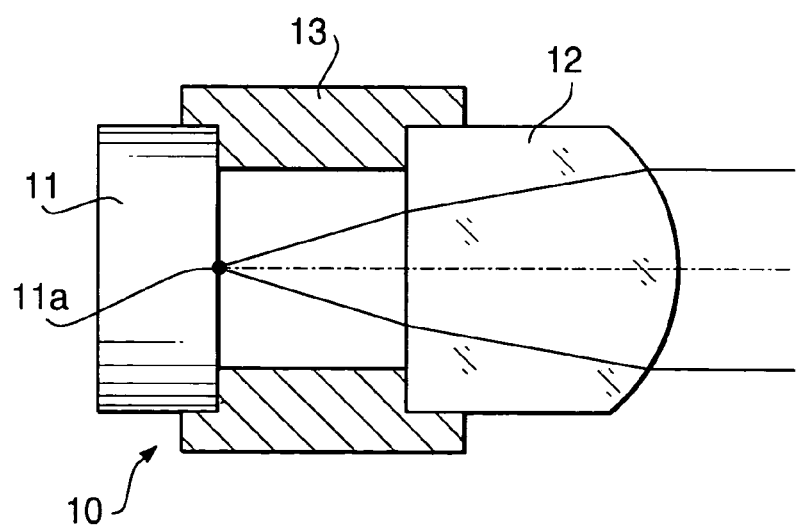
Figure 3A:
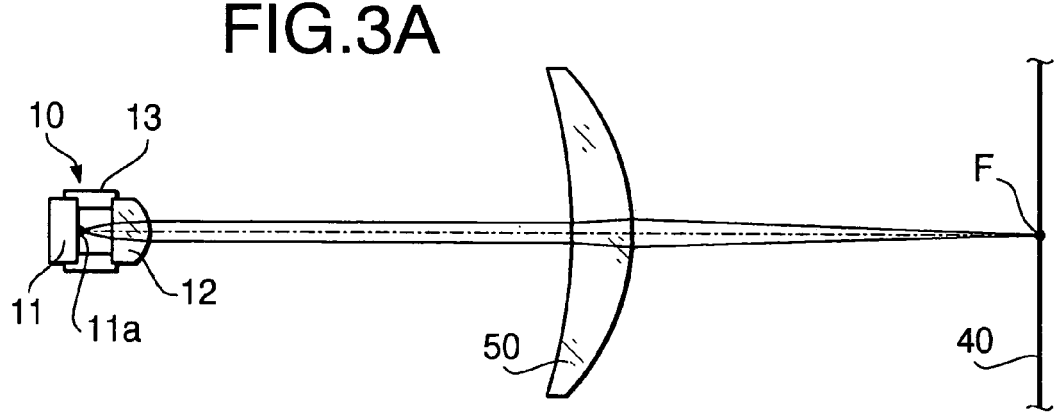
Figure 3B:
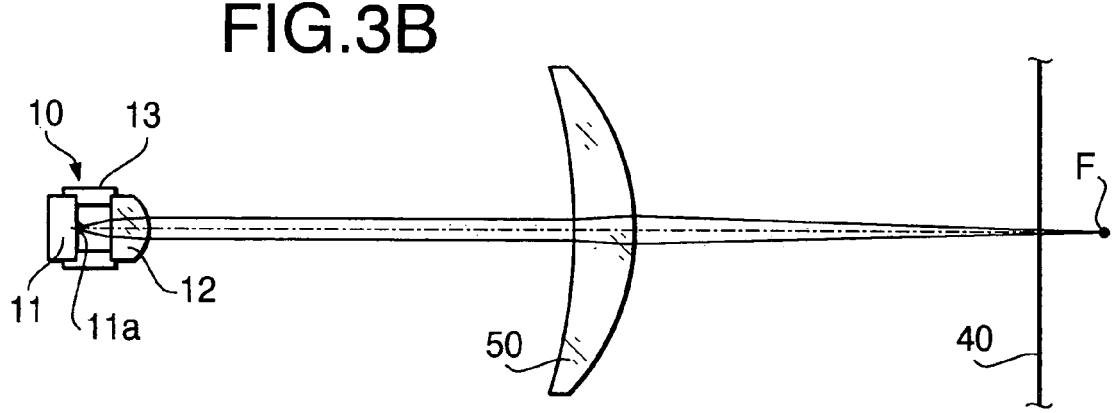
Figure 3C:
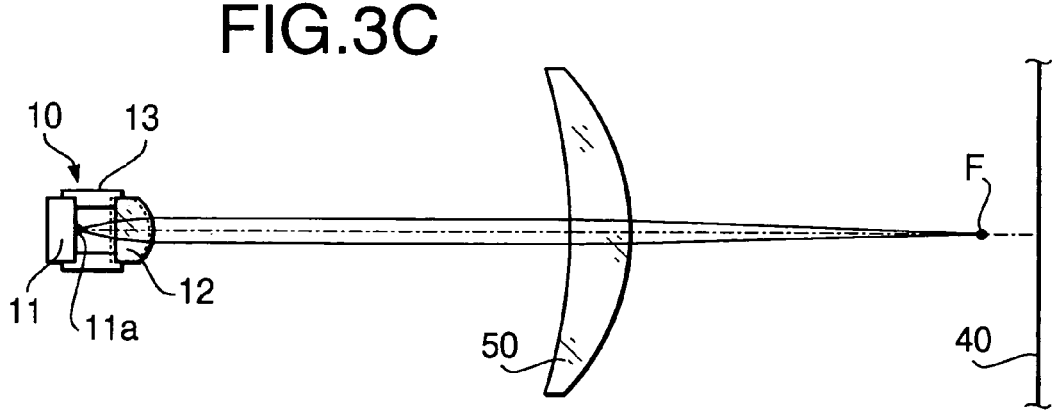

FIG. 1 is an explanatory diagram illustrating a configuration of an optical system of a scanning optical apparatus according to an embodiment of the invention;

FIG. 2 is an enlarged cross-sectional view of a light source unit employed in the optical system shown in FIG. 1; and FIGS. 3A–3C show deviation of a focusing point due to temperature change, FIG. 3A showing a reference state (at a design temperature) where no deviation occurs, FIG. 3B showing the deviation of the focusing point due to the change of the focal length of the scanning lens when the temperature rises, FIG. 3C showing the deviation of the focusing point due to the expansion of the securing member when the temperature rises.

DETAILED DESCRIPTION OF THE EMBODIMENT

An embodiment of a scanning optical apparatus according to the invention will be described with reference to the accompanying drawings.

FIG. 1 is an explanatory diagram illustrating a configuration of an optical system 100 of a scanning optical apparatus according to an embodiment of the invention, and FIG. 2 is an enlarged cross-sectional view of a light source unit 10 employed in the optical system shown in FIG. 1.

As shown in FIG. 1, the optical system 100 of the scanning optical apparatus is provided with a light source unit 10 that emits a substantially collimated laser beam, a cylindrical lens 20 converges the incident beam only in an auxiliary scanning direction, a polygonal mirror 30 that dynamically deflects the laser beam converged by the cylindrical lens 20 in a main scanning direction, and a scanning lens 50 that converges the deflected laser beam on a target surface 40 (e.g., a circumferential surface of a photoconductive drum). The scanning lens 50 is configured to have a first lens 51 and a second lens 52, which are made of plastic and arranged in the order from the polygonal mirror side.

As shown in an enlarged view of FIG. 2, the light source unit 10 includes a laser diode 11 that emits a laser beam as a diverging light beam and a collimating lens 12 which is arranged such that a front focal point thereof coincides with a light emitting point 11a of the laser diode 11. With this arrangement, the laser beam emitted from the light emitting point 11a is collimated by the collimating lens 12. The laser diode 11 and the collimating lens 12 are fixed and held by a cylindrical plastic support member 13. The collimating lens 12 is a piano-convex lens having a planar surface on the laser diode side and a convex surface on the cylindrical lens side. In the description hereafter, a distance from the light emitting point 11a to a position where the support member 13 holds the collimating lens 12 is defined as an effective length L of the support member 13. Specifically, according to the embodiment shown in FIG. 2, the effective length L is equal to a distance from the light emitting point 11a to the planar surface of the collimating lens 12 along an optical axis. In particular, when a focal point of the collimating lens 12 coincides with the light emitting point 11a, the length L is equal to a back focus fb of the collimating lens 12.

FIGS. 3A–3C show deviation of a focusing point due to temperature change. In particular, FIG. 3A shows an optical path of the laser beam in the optical system 100 in a developed fashion (the polygonal mirror being omitted in this figure) when the temperature is a design temperature. In this reference state shown in FIG. 3A, the optical system 100 functions such that the diverging light beam emitted from the light emitting point 11a is collimated by the collimating lens 12. The collimated light beam is incident on the scanning lens 50, which converges the beam on the target surface 40. In the reference state, the focusing point of the beam is on the target surface 40 as shown in FIG. 3A. It is noted that, since the second lens 52 of the scanning lens 50 has substantially no power in the main scanning direction, only the first lens 51 is depicted as the scanning lens 50 in this view.

If the temperature rises, the focal length of the scanning lens 50 increases and the support member 13 expands. FIG. 3B shows the deviation of the focusing point due to the change of the focal length of the scanning lens 50 when the temperature rises, and FIG. 3C shows the deviation of the focusing point due to the expansion of the securing member when the temperature rises. When the temperature rises, increase of the focal length serves to shift the focusing point F so that it becomes farther from the scanning lens 50 than the focusing point F in the reference state. On the other hand, as shown in FIG. 3C, the expansion of the support member 13 serves to shift the collimating lens 12 from the position indicated by a dashed line to the position indicated by a solid line, thus increasing a distance between the light emitting point 11a and the collimating lens 12. In this case, the focal point F is shifted so that it becomes closer to the scanning lens 50 than the focusing point F in the reference state.

Change $\Delta S$ of the focal length (which is equal to the deviation of the focusing point) of the scanning lens 50 at a temperature change of $\Delta T$ is given by the following equation (1), given that f and n are the focal length and refractive index of the scanning lens 50, respectively.

$$\Delta S = f \cdot \left( \frac{1}{1-n} \cdot \frac{dn}{dt} \cdot \frac{1}{l} \cdot \frac{dl}{dt} \right) \times \Delta T \tag{1}$$

where dn/dt denotes a rate of change in refractive index of the scanning lens 50 with respect to the temperature change, and (1/l·dl/dt) denotes a linear expansion coefficient of the scanning lens 50.

Furthermore, a relative deviation $\Delta U$ between the focusing point of the collimating lens 12 and the light emitting point 11a due to the linear expansion of the support member 13 caused by temperature change $\Delta T$ is given by the following equation (2), given that the linear expansion coefficient of the support member 13 is $\alpha$.

$$\Delta U = \alpha \times L \times \Delta T \tag{2}$$

Additionally, the deviation $\Delta V$ of the focusing point on the side of the scanned surface 40 due to the above deviation $\Delta U$ is given by the following equation (3), given that a lateral magnification of a portion of the optical system 100 (i.e., from the light emitting point 11a to the target surface 40) in the main scanning direction is M.

$$\Delta V = \Delta U \times M^2 = \Delta U \times \left( \frac{f}{fc} \right)^2 \tag{3}$$

The changes of $\Delta S$ and $\Delta V$ due to the change of the temperature occur in opposite directions as shown in FIGS. 3B and 3C. Therefore, by combining them, it is possible to reduce the temperature dependence of the changes of the entire apparatus.

For example, a method for using a scanning lens of plastic and a support member of aluminum or zinc to cancel out the changes ΔS and ΔV with each other is disclosed in the afore-mentioned patent publication. However, according to the configuration disclosed in the publication, if the support member is formed of plastic, the linear expansion coefficient α of the support member is relatively large, and the change ΔU becomes large, and it becomes impossible to cancel out the changes ΔS and ΔV with each other.

According to the optical system 100 of the embodiment, by increasing a thickness of the collimating lens 12, i.e., by making a back focus relatively short with respect to the focal length, the effective length L of the support member 13 is shortened. Therefore, even when the support member 13 is made of plastic, which has a relatively large linear expansion coefficient α, is used, the change ΔU can be suppressed and thus the changes ΔS and ΔV are cancelled out each other.

Specifically, the optical system 100 of the scanning optical apparatus according to the embodiment is a magnifying optical system which is configured such that a ratio of a focal length f of the scanning lens 50 to a focal length fc of the collimating lens 12 in the main scanning direction satisfies the following condition (4), and further, the thickness t of the collimating lens 12 satisfies the following condition (5) so that the changes ΔS and ΔV are cancelled out by each other, given that the refractive index of the collimating lens 12 is nc.

$$10 < \frac{f}{fc} < 20 \quad (4)$$

$$fc \cdot nc > t > fc\left(\frac{nc}{nc+1}\right) \quad (5)$$

By configuring the optical system 100 to satisfy the condition (5), it becomes possible to reduce the back focus fb in comparison with the focal length fc of the collimating lens 12, thereby reducing the effective length L of the support member 13. Therefore, even if the linear coefficient α is large, the change ΔU can be fallen within an appropriate range. Consequently, even when plastic, which is a low-cost material, is used as a material for the support member 13, the deviation ΔV of the focusing point due to change in the distance between the light emitting point 11a and the collimating lens 12, which is caused by the temperature change, can be cancelled out with the deviation ΔS of focusing point due to temperature change of the scanning lens 50.

If the thickness t is below the lower bound in the condition (5), the back focus fb of the collimating lens 12 is longer and the distance between the collimating lens 12 and the light emitting point 11a of the laser diode 11 is larger. Consequently, the effective length L of the support member 13 becomes longer, requiring a long-sized support member. That is, a low-cost plastic support member, which has a relatively large linear expansion coefficient, cannot be used as the material of the support member. If the thickness t is above the higher bound in the condition (5), the back focus fb of the collimating lens 12 becomes too short, making it impossible to provide a necessary working distance and it becomes impossible to make the collimating lens 12 emit a collimated light beam.

The support member 13 is formed of plastic with the linear expansion coefficient, α>4×10$^{-5}$, which coefficient is measured in the direction of the optical axis, and the optical system 100 is designed to satisfy the following condition (6).

$$150 \times 10^{-6} < \alpha \cdot \left(fc - \frac{t}{nc}\right) \cdot \frac{f}{fc^2} < 325 \times 10^{-6} \quad (6)$$

By configuring the optical system 100 such that the condition (6) is satisfied, the deviation ΔS of the focusing point due to the temperature change of the scanning lens 50 can be compensated for with high accuracy by change ΔU in the distance between the light emitting point 11a and the collimating lens 12 due to the thermal expansion of the support member 13.

If the middle term of the inequality (6) is below the lower bound in the condition (6), even though the influence due to the temperature change of the light source unit 10 is small, the influence of the temperature change on the scanning lens 50 remains, resulting in under correction. If the middle term exceeds the upper bound in the condition (6), the correction of the deviation ΔV of the focusing point due to the linear expansion of the support member 13 is over-corrected compared to the correction of the deviation ΔS of the focusing point due to the temperature change of the scanning lens 50.

Next, five numerical examples satisfying the above conditions will be explained. Regarding the configuration of the collimating lens 12, a radius of curvature, a distance between lens surfaces, and a refractive index, all of which determine the configuration of the collimating lens 12, are concretely specified. Regarding the scanning lens 50, only the focal length and deviation ΔS of the focusing point due to temperature change are indicated. It should be noted that, in the following description on the deviation of the focusing point, the plus/minus (+/−) sign is given such that the deviation on a side opposite to the scanning lens 50 with respect to the target surface 40 is indicated with a positive value (i.e., plus sign) and the deviation on the scanning lens side with respect to the target surface 40 is indicated with a negative value (i.e., minus sign).

EXAMPLE 1

The collimating lens 12 according to Example 1 is configured as indicated in Table 1. The focal length fc of the collimating lens according to Example 1 is 13.5 mm.

TABLE 1

| | radius of curvature | surface distance | refractive index |
| --- | --- | --- | --- |
| R1 (light source side) | ∞ | 10.00 | 1.51072 |
| R2 (polygonal mirror side) | −6.894 | | |

In Example 1, the linear expansion coefficient α of the support member 13 is 4.50×10$^{-5}$, the effective length L of the support member 13 is 6.9 mm, and the focal length f of the scanning lens 50 is 145.0 mm.

According to the above configuration, the deviation ΔS of the focusing point due to the change in refractive index of the scanning lens 50 and due to the linear expansion thereof when the temperature change ΔT of +10 degrees C. is +0.40 mm, while the deviation ΔV of the focusing point due to the linear expansion of the support member 13 is −0.36 mm. As a result, the overall deviation of the focusing point can be suppressed to +0.04 mm.

EXAMPLE 2

The collimating lens 12 according to Example 2 is configured as indicated in Table 2. The focal length fc of the collimating lens according to Example 2 is 12.0 mm.

TABLE 2

|  | radius of curvature | surface distance | refractive index |
|---|---|---|---|
| R1 (light source side) | ∞ | 10.00 | 1.82497 |
| R2 (polygonal mirror side) | −9.900 |  |  |

In Example 2, the linear expansion coefficient α of the support member 13 is $4.50 \times 10^{-5}$, the effective length L of the support member 13 is 6.5 mm, and the focal length f of the scanning lens 50 is 135.5 mm.

According to the above configuration, the deviation ΔS of the focusing point due to the change in refractive index of the scanning lens 50 and due to the linear expansion thereof when the temperature change ΔT of +10 degrees C. is +0.37 mm, while the deviation ΔV of the focusing point due to the linear expansion of the support member 13 is −0.37 mm. As a result, the overall deviation of the focusing point can be made to +0.00 mm.

EXAMPLE 3

The collimating lens 12 according to Example 3 is configured as indicated in Table 3. The focal length fc of the collimating lens according to Example 3 is 15.0 mm.

TABLE 3

|  | radius of curvature | surface distance | refractive index |
|---|---|---|---|
| R1 (light source side) | ∞ | 10.00 | 1.58252 |
| R2 (polygonal mirror side) | −8.738 |  |  |

In Example 3, the linear expansion coefficient α of the support member 13 is $4.50 \times 10^{-5}$, the effective length L of the support member 13 is 8.7 mm, and the focal length f of the scanning lens 50 is 180.0 mm.

According to the above configuration, the deviation ΔS of the focusing point due to the change in refractive index of the scanning lens 50 and due to the linear expansion thereof when the temperature change ΔT of +10 degrees C. is +0.50 mm, while the deviation ΔV of the focusing point due to the linear expansion of the support member 13 is −0.56 mm. As a result, the overall deviation of the focusing point can be suppressed to −0.06 mm.

EXAMPLE 4

The collimating lens 12 according to Example 4 is configured as indicated in Table 4. The focal length fc of the collimating lens according to Example 4 is 8.0 mm.

TABLE 4

|  | radius of curvature | surface distance | refractive index |
|---|---|---|---|
| R1 (light source side) | ∞ | 9.00 | 1.51072 |
| R2 (polygonal mirror side) | −4.086 |  |  |

In Example 4, the linear expansion coefficient α of the support member 13 is $7.00 \times 10^{-5}$, the effective length L of the support member 13 is 2.0 mm, and the focal length f of the scanning lens 50 is 145.0 mm.

According to the above configuration, the deviation ΔS of the focusing point due to the change in refractive index of the scanning lens 50 and due to the linear expansion thereof when the temperature change ΔT of +10 degrees C. is +0.40 mm, while the deviation ΔV of the focusing point due to the linear expansion of the support member 13 is −0.46 mm. As a result, the overall deviation of the focusing point can be suppressed to −0.06 mm.

EXAMPLE 5

The collimating lens 12 according to Example 5 is configured as indicated in Table 5. The focal length fc of the collimating lens according to Example 5 is 10.0 mm.

TABLE 5

|  | radius of curvature | surface distance | refractive index |
|---|---|---|---|
| R1 (light source side) | ∞ | 12.00 | 1.48262 |
| R2 (polygonal mirror side) | −4.826 |  |  |

In Example 4, the linear expansion coefficient α of the support member 13 is $7.00 \times 10^{-5}$, the effective length L of the support member 13 is 2.0 mm, and the focal length f of the scanning lens 50 is 125.0 mm.

According to the above configuration, the deviation ΔS of the focusing point due to the change in refractive index of the scanning lens 50 and due to the linear expansion thereof when the temperature change ΔT of +10 degrees C. is +0.34 mm, while the deviation ΔV of the focusing point due to the linear expansion of the support member 13 is −0.22 mm. As a result, the overall deviation of the focusing point can be suppressed to +0.12 mm.

Values corresponding to the conditions (4), (5) and (6) for the individual examples are indicated in Table 6. Each example is a magnification optical system satisfying condition (4). By configuring the optical sysetm to satisfy both the conditions (5) and (6), the effective length L of the support member 13 can be shortened.

TABLE 6

|  | f/fc | fc · nc | t | $fc\left(\dfrac{nc}{nc+1}\right)$ | $\alpha \cdot \left(fc - \dfrac{t}{nc}\right) \cdot \dfrac{f}{fc^2}$ |
|---|---|---|---|---|---|
| Example 1 | 10.7 | 20.39 | 10.0 | 8.12 | $246 \times 10^{-6}$ |
| Example 2 | 11.3 | 21.90 | 10.0 | 7.75 | $276 \times 10^{-6}$ |
| Example 3 | 12.0 | 23.74 | 10.0 | 9.19 | $313 \times 10^{-6}$ |
| Example 4 | 18.1 | 12.09 | 9.0 | 4.81 | $324 \times 10^{-6}$ |
| Example 5 | 12.5 | 14.83 | 12.0 | 5.97 | $167 \times 10^{-6}$ |

According to the embodiment above, even when the support member 13 is formed of a material with large linear expansion coefficient, deviation of the focusing point due to the change of the distance between the light emitting point and the collimating lens, which is caused by temperature change, can be cancelled out with the deviation of the focusing point due to temperature change of the scanning lens 50.

The present disclosure relates to the subject matter contained in Japanese Patent Application No. 2003-430590, filed on Dec. 25, 2003, which is expressly incorporated herein by reference in its entirety.

What is claimed is:

1. A scanning optical apparatus, comprising:
   a laser diode that emits a laser beam;
   a collimating lens that collimates the laser beam emitted by the laser diode;
   a support member that holds and supports the laser diode and the collimating lens;
   a deflection member that dynamically deflects the laser beam collimated by the collimating lens in a main scanning direction; and
   a plastic scanning lens that converges the deflected laser beam onto a target surface,
   the scanning optical apparatus being configured to satisfy following conditions:

$$10 < \frac{f}{fc} < 20; \text{ and } fc \cdot nc > t > fc\left(\frac{nc}{nc+1}\right),$$

where
   f denotes a focal length of the scanning lens in the main scanning direction;
   fc denotes a focal length of the collimating lens;
   nc denotes a refractive index of the collimating lens; and
   t denotes a thickness of the collimating lens along an optical axis.

2. The scanning optical apparatus according to claim 1, wherein the support member is made of plastic, linear expansion coefficient $\alpha$, in the optical axis direction, of which satisfies a condition $\alpha > 4 \times 10^{-5}$, and
   wherein the scanning optical apparatus is configured to satisfy a following condition:

$$150 \times 10^{-6} < \alpha \cdot \left(fc - \frac{t}{nc}\right) \cdot \frac{f}{fc^2} < 325 \times 10^{-6}.$$

3. The scanning optical apparatus according to claim 1, wherein the collimating lens is a piano-convex lens having a planar surface on the laser diode side and a convex surface on the deflection member side.

4. The scanning optical apparatus according to claim 2, wherein the linear expansion coefficient $\alpha$ satisfies a condition:

$$\alpha \geq 7 \times 10^{-5}.$$

5. The scanning optical apparatus according to claim 4, wherein the collimating lens is a piano-convex lens having a planar surface on the laser diode side and a convex surface on the deflection member side.

* * * * *